United States Patent
Koyama et al.

(10) Patent No.: US 7,594,761 B2
(45) Date of Patent: Sep. 29, 2009

(54) CYLINDRICAL ROLLER BEARING AND CAGE FOR CYLINDRICAL ROLLER BEARINGS

(75) Inventors: Mineo Koyama, Mie-ken (JP); Masatsugu Mori, Mie-ken (JP)

(73) Assignee: NTN Corporation, Osaka-Fu (JP)

( * ) Notice: Subject to any disclaimer, the term of this patent is extended or adjusted under 35 U.S.C. 154(b) by 609 days.

(21) Appl. No.: 10/823,770

(22) Filed: Apr. 14, 2004

(65) Prior Publication Data

US 2004/0234184 A1 Nov. 25, 2004

(30) Foreign Application Priority Data

Apr. 15, 2003 (JP) .............................. 2003-110372

(51) Int. Cl.
*F16C 33/48* (2006.01)
*F16C 19/00* (2006.01)

(52) U.S. Cl. ....................................... 384/572; 384/450

(58) Field of Classification Search ................. 384/450, 384/470, 572, 576, 623
See application file for complete search history.

(56) References Cited

U.S. PATENT DOCUMENTS

| | | | | |
|---|---|---|---|---|
| 1,170,733 A | * | 2/1916 | Bower | 384/572 |
| 1,230,145 A | * | 6/1917 | Folk | 384/575 |
| 2,219,031 A | * | 10/1940 | Frauenthal et al. | 384/572 |
| 2,591,160 A | * | 4/1952 | Kilian | 384/575 |
| 5,584,583 A | * | 12/1996 | Hidano | 384/470 |
| 5,826,988 A | * | 10/1998 | Furukawa et al. | 384/572 |
| 6,068,406 A | * | 5/2000 | Yoshida et al. | 384/470 |
| 6,132,102 A | * | 10/2000 | Bessone et al. | 384/576 |
| 6,742,934 B2 | * | 6/2004 | Matsuyama et al. | 384/572 |
| 6,955,476 B1 | * | 10/2005 | Murai | 384/580 |
| 2003/0068110 A1 | * | 4/2003 | Matsui et al. | 384/572 |

FOREIGN PATENT DOCUMENTS

| | | |
|---|---|---|
| JP | 11-051060 | 2/1999 |
| JP | 2001-330036 | 11/2001 |
| JP | 2002-323048 A | 11/2002 |

* cited by examiner

*Primary Examiner*—Thomas R Hannon
*Assistant Examiner*—Justin Krause
(74) *Attorney, Agent, or Firm*—Arent Fox LLP

(57) ABSTRACT

Let r be the radius of curvature of the corners of pockets of a cage, and Lw be the length of cylindrical rollers. They are set such that the relation $r/Lw \geq 0.1$ holds. Further, the relation $r/k1 \leq 1$ holds, where k1 is the minimum dimension on the inner diameter side of the annulus of the cage.

15 Claims, 11 Drawing Sheets

CYLINDRICAL ROLLER BEARING AND CAGE FOR CYLINDRICAL ROLLER BEARINGS

BACKGROUND OF THE INVENTION

1. Field of the Invention

The present invention relates to a cylindrical roller bearing and a cage for cylindrical roller bearings. There are various types of cylindrical roller gearings, including the N type (inner ring with two ribs) NU type (outer ring with two ribs), NF type (inner ring with two ribs, outer ring with single rib), NJ type (inner ring with single rib, outer ring with two ribs), and NUP type (inner ring with two ribs, of which one rib is constituted by a separate rib ring, outer ring with two ribs).

2. Description of the Prior Art

For example, main shaft devices for machine tools, such as machining centers, CNC laths, and milling machine, are often operated in high speed rotation for reasons including one intended to increase work machining efficiency and accuracy. Particularly nowadays, the trend toward speeding up by main shaft rotation speed is remarkable.

Generally, in a main shaft device for machine tools, the main shaft is supported for rotation relative to a housing in rolling bearings disposed on the front side (tool side) and rear side (counter tool side), and the rolling bearings are lubricated by such lubrication systems as oil mist lubrication, air oil lubrication, jet lubrication, and grease lubrication, depending on usage conditions or the like. Normally, the rolling bearing on the front side has a construction that does not allow axial displacement of the main shaft (fixed side), while the rolling bearing on the rear side has a construction that allows axial displacement of the main shaft (free side) in order to absorb or relieve the amount of axial expansion of the main shaft due to the heat produced during operation. Such rolling bearing used on the front side is often in the form of a combination angular ball bearing or combination angular ball bearing+double row cylindrical roller bearing, while the rolling bearing used on the rear side is often in the form of a combination angular ball bearing or double row or single low cylindrical roller bearing.

FIG. 10 shows a structural example of a cylindrical roller bearing. This cylindrical roller bearing comprises an inner ring 1 having a raceway surface 1a in the outer periphery, an outer ring 2 having a raceway surface 2a in the inner periphery, a plurality of cylindrical rollers 3 rollably disposed between the raceway surface 1a of the inner ring 1 and the raceway surface 2a of the outer ring 2, and a cage 4 for holding the cylindrical rollers 3 at predetermined circumferentially spaced intervals. The opposite sides of the inner ring 1 are each provided with a rib 1b.

There are two guide (positioning) types for the cage: an outer ring or inner ring guide type for guiding the cage by the inner peripheral surface of the outer ring or the outer peripheral surface of the inner ring, and a roller guide type for guiding the cage by rollers. In the case of the roller guided cage, during high speed rotation the cage, under the influence of centrifugal force, tends to whirl or tends to be deformed under excessive load from the rollers, resulting in a break (see Japanese Patent Unexamined Specification 2002-323048).

With the roller guide types for the cage, in order to reduce whirling, the radial clearance δ (diametrical clearance) between the cage pocket and the cylindrical rollers has been set small. For example, the ratio of the clearance to the diameter Dw of the cylindrical rollers, δ/Dw, is set to 0.01-0.10. Particularly, in the case of high speed rotation, it is set to 0.01-0.05.

In the meantime, the cylindrical roller bearing for the main shaft of a machine tool, for example, aims at reducing the radial internal clearance after assembly to zero in order to attain processing of high accuracy and to suppress the chattering of the main shaft. During operation, the inner ring temperature is higher than the outer ring temperature, in which case the amount of expansion of the inner ring is larger than that of the outer ring, so that the initial radial internal clearance further reduces to a negative value (preloaded state).

Generally, in the bearing in operation, the rolling elements do not advance at given intervals under the influence of the dimensions and shapes of the rolling elements, cage and inner and outer rings; rather, some lead and some lag. In the case where there is a radial internal clearance, even if such lag-lead occurs in the loaded region, it is relieved in the clearance region, so that there is no possibility of the force (difference between lag and lead) building up. In the negative clearance state, however, since there is no region for relief, the generated lag-lead builds up, and its force influences the cage.

The force acting on the cage from the rollers due to lag-lead can cause deformation of the entire annulus of the cage, not to mention the deformation of the tongue pieces of the cage contacting the rollers. If the spring force due to deformation of the cage (which spring force corresponds, for example, to the force by which the annulus of the cage returns to the original state after it is deformed to oval, or the force by which the tongue pieces return to the original state after they are deformed toward the column middle by the force from the rollers) becomes greater than the force from the rollers, a slip occurs between the rolling elements and the raceway surfaces, whereby the buildup of force is temporarily relieved. In the case where no consideration is given to the strength aspect of the cage, however, the cage cannot withstand repetition of such deformation and relief during operation, possibly resulting in a break.

Operating conditions for modern machine tools require speeding up, of course, and reaching maximum rpm in a short time and stopping in a short time (quick acceleration and quick stoppage), in order to shorten the jig exchange time, so that the force acting on the cage is on the increase.

Further, in order to cope with high accuracy and high speed operation, there are cases where the housing is cooled. Though having the advantage of the bearing temperature being lowered, this positively cools the outer ring to produce a greater difference in temperature between the inner and outer rings, causing the radial internal clearance during operation to become a negative clearance (increase in preload), which is also a main cause of increasing the force acting on the cage.

SUMMARY OF THE INVENTION

An object of the present invention is to provide a cylindrical roller bearing that exhibits its performance in a stabilized manner during high speed operation and under quick acceleration and deceleration conditions by increasing the strength of the cage.

The invention provides a cylindrical roller bearing comprising an inner ring having a raceway surface in the outer periphery, an outer ring having a raceway surface in the inner periphery, a plurality of cylindrical rollers rollably disposed between the raceway surface of the inner ring and the raceway surface of the outer ring, and a resin cage holding the cylindrical rollers at predetermined intervals, said cylindrical roller bearing being characterized in that said cage is composed of a pair of annuluses and a plurality of columns interconnecting the annuluses, and pockets are formed for receiving cylindrical rollers 30 between adjacent columns and are radially positioned with respect to the cylindrical rollers, and the relation $r/Lw \geqq 0.1$ holds where r is the radius of curvature of the corners of the pockets of the cage, and Lw is the length of the cylindrical rollers. Since the cage is made of resin, concerning a break in the cage, there is a danger that a break progresses in the direction of the column from the pocket corners or in the direction of the width surface of the annulus, a problem that should be handled with particular care. In the case where the radius of curvature, r, of the pocket corners is small, stress concentration tends to break the columns or annuluses, so that it is necessary that the corner radius of curvature, r, be large such that $r/Lw \geqq 0.1$.

According to the invention, since the cage stably exhibits its performance even during high speed operation and under quick acceleration and deceleration operation conditions, it is possible to provide a cylindrical roller bearing that is more suitable for high speed rotation.

The relation $r/k1 \leqq 1$ may hold, where r is the radius of curvature of the corners of the pockets of the cage, and k1 is the minimum dimension on the inner diameter side of the annulus of the cage. If the radius of curvature, r, of the corners is rashly increased in order to mitigate stress concentration, there is a danger of a break occurring in the annulus. To avoid this, it is preferable that the radius of curvature, r, of the corners be smaller than the minimum dimension k1 on the inner diameter side of the annulus. This is for the purpose of avoiding a break in the annulus caused by the pulling force on the inner diameter side as the annulus of the cage is deformed by lag-lead of the cylindrical rollers. In addition, if the radius of curvature, r, of the corners can be increased and the minimum dimension k1 on the inner diameter side of the cage annulus can be secured, there will be no problem. However, the cage width is generally set smaller than the bearing width surface, and the overall annulus width is also limited. Further, there are cases where a nozzle-equipped spacer is set in the cage inner diameter and the inner ring outer diameter (Japanese Patent Application 2002-358850), the minimum dimension k1 on the inner diameter side of the annulus also being limited.

The relation $r<k2+r1$ may hold, where r is the radius of curvature of the corners of the pocket of the cage, k2 is the amount of projection of a contact section of the pocket for contact with the cylindrical roller end surface, and r1 is the axial chamfer of the cylindrical roller. Employment of such arrangement makes it possible to avoid interference between the radius of curvature, r, of the corners of the pocket and the roller chamfer.

The relation $w5 \cdot Z/\phi d1 \cdot \pi > 0.1$ may hold, where $\phi d1$ is the inner diameter of the cage, w5 is the distance from the contact section of the pocket that contacts the cylindrical roller end surface to the column, and z is the number of cylindrical rollers. When the annulus is deformed, the vicinity (w5) of the column of the pocket is where stress easily concentrates, but because of the presence of the contact section that contacts the end surface of the cylinder roller, stress concentrates more easily. In order to mitigate stress concentration by securing w5, it is necessary to secure a proportion of w5 with respect to the circumferential length on the inner diameter side of the annulus, and an arrangement in which the formula $w5 \cdot Z/\phi d1 \cdot \pi > 0.1$ holds has the effect of avoiding a break in the annulus.

DESCRIPTION OF THE PREFERRED EMBODIMENTS

Embodiments of the invention will now be described with reference to the drawings.

Figure 9:
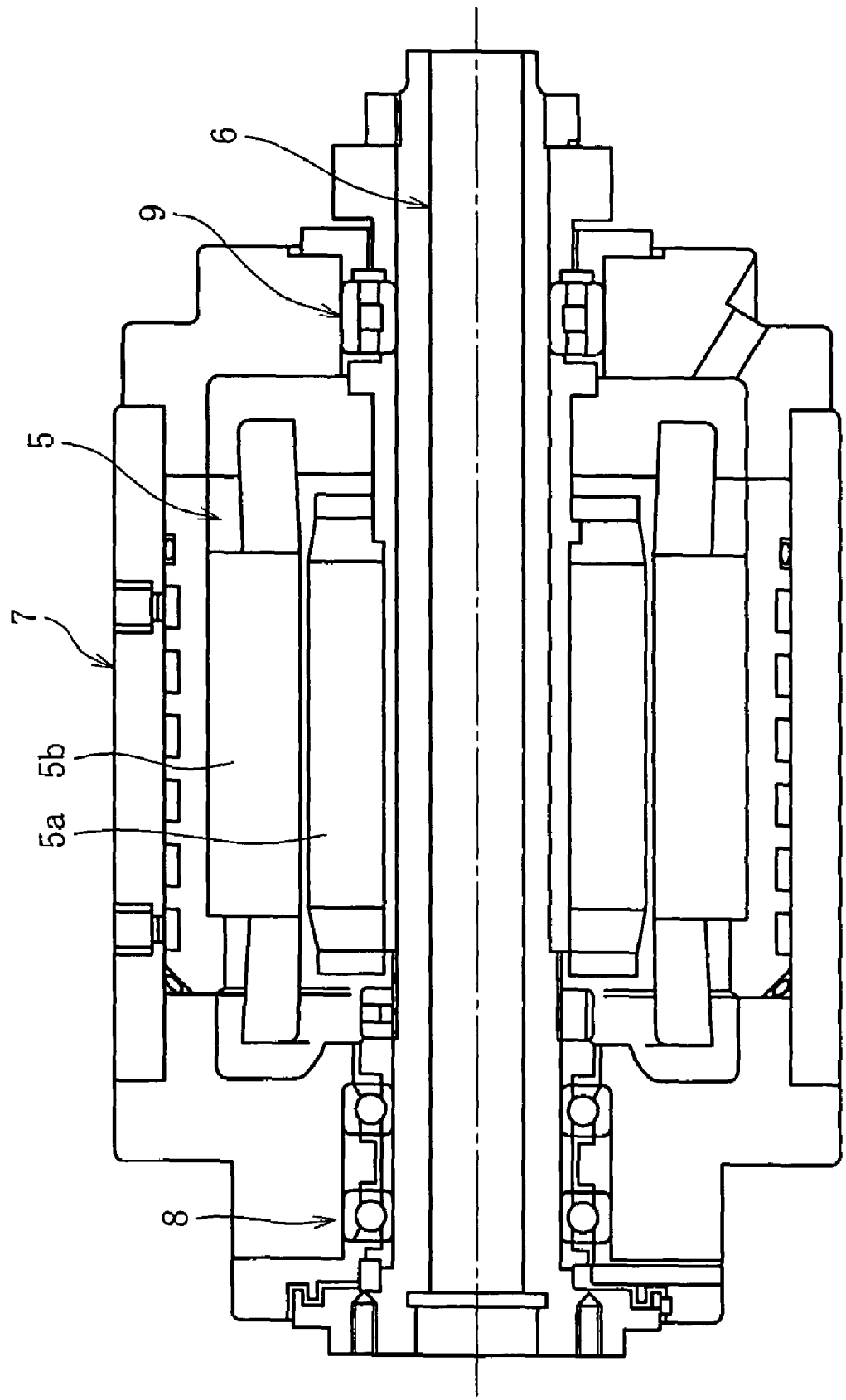
FIG. 9 is a longitudinal sectional view showing a structural example of the main shaft device of a machine tool.
Figure 10:
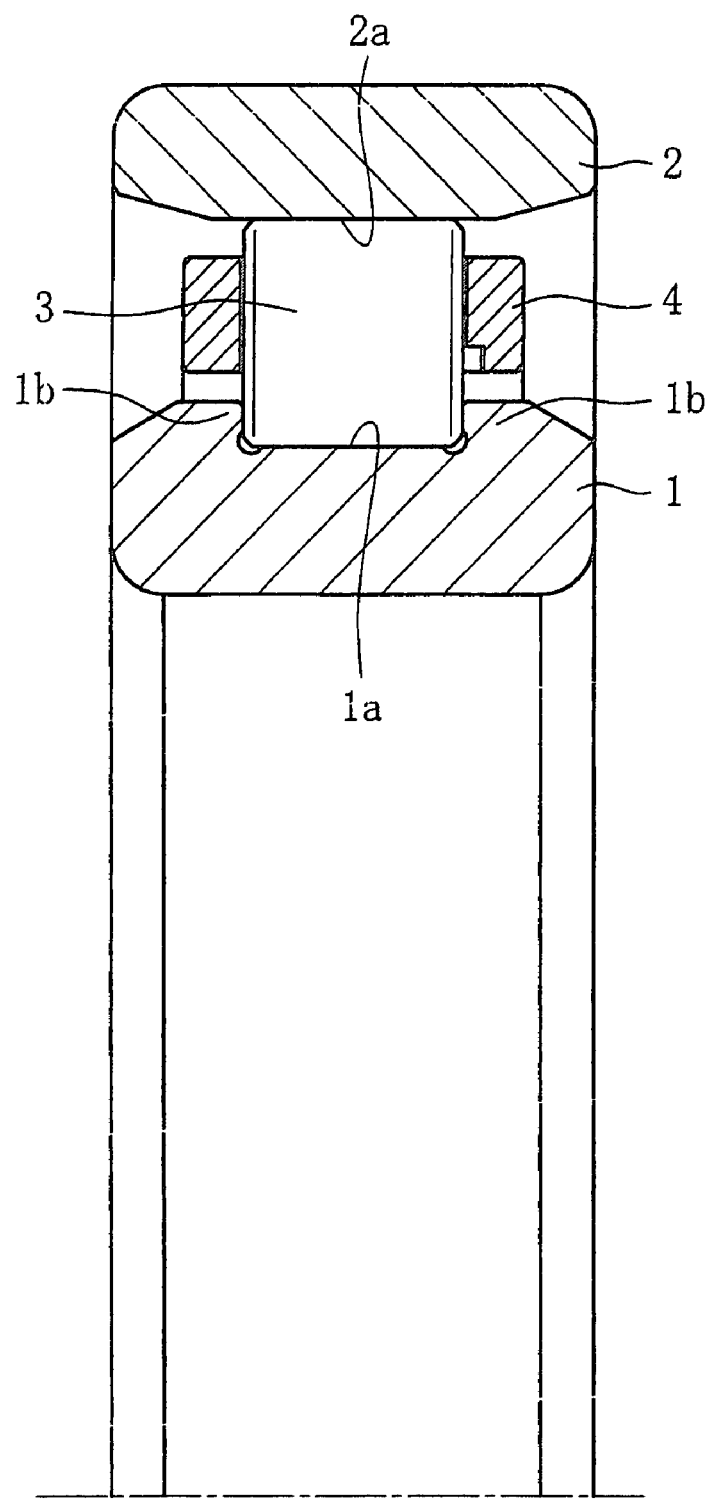
FIG. 10 is a sectional view of a conventional cylindrical roller bearing.

FIG. 9 shows a structural example of a main shaft device in a machine tool such as a machining center or a grinding machine. This main shaft device, which is called the built-in type, comprises a motor 5 disposed at the axial center of the main shaft device, a rotor 5a disposed on the outer periphery of the main shaft 6, and a stator 5b disposed on the inner periphery of a housing 7. When a current is applied to the stator 5b, an exciting force is generated between the stator 5b and the rotor 5a, the exciting force driving the main shaft 6. The main shaft 6 is supported for rotation relative to the housing 7 in rolling bearings disposed on the front side (tool side) and on the rear side (counter tool side), respectively. Normally, the rear side has a construction that allows axial displacement of the main shaft 6 in order to absorb or relieve the amount of axial expansion of the main shaft 6 due to the heat produced during operation (free side). In this example, the front side employs a combination angular ball bearing 8 (a pair of angular ball bearings), and the rear side employs a single row cylindrical roller bearing 9.

Figure 1A:
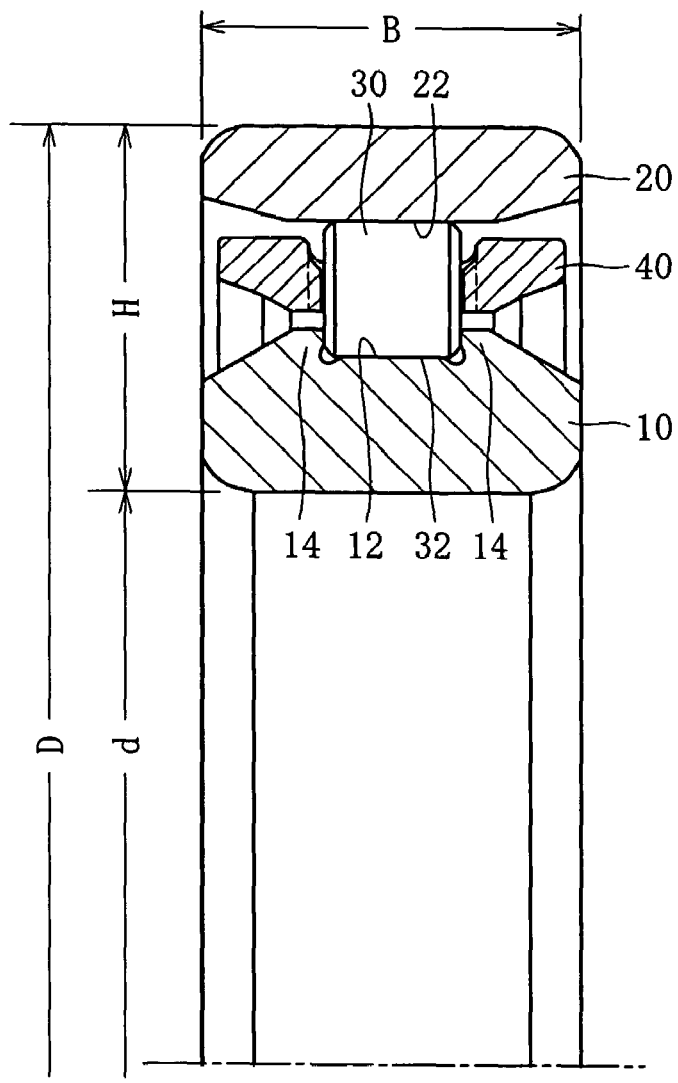
FIG. 1A is a longitudinal sectional view of a cylindrical roller bearing showing an embodiment of the invention.
Figure 1B:
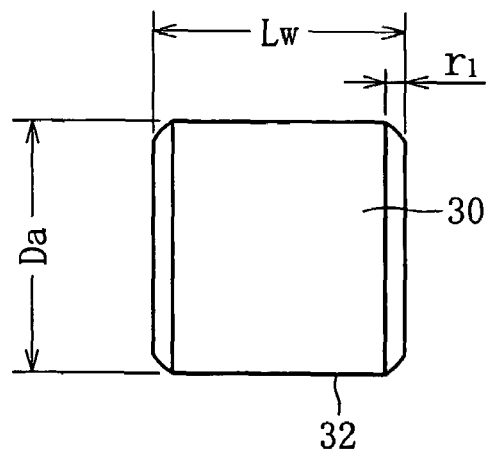
FIG. 1B is a front view of a cylindrical roller.
Figure 2:
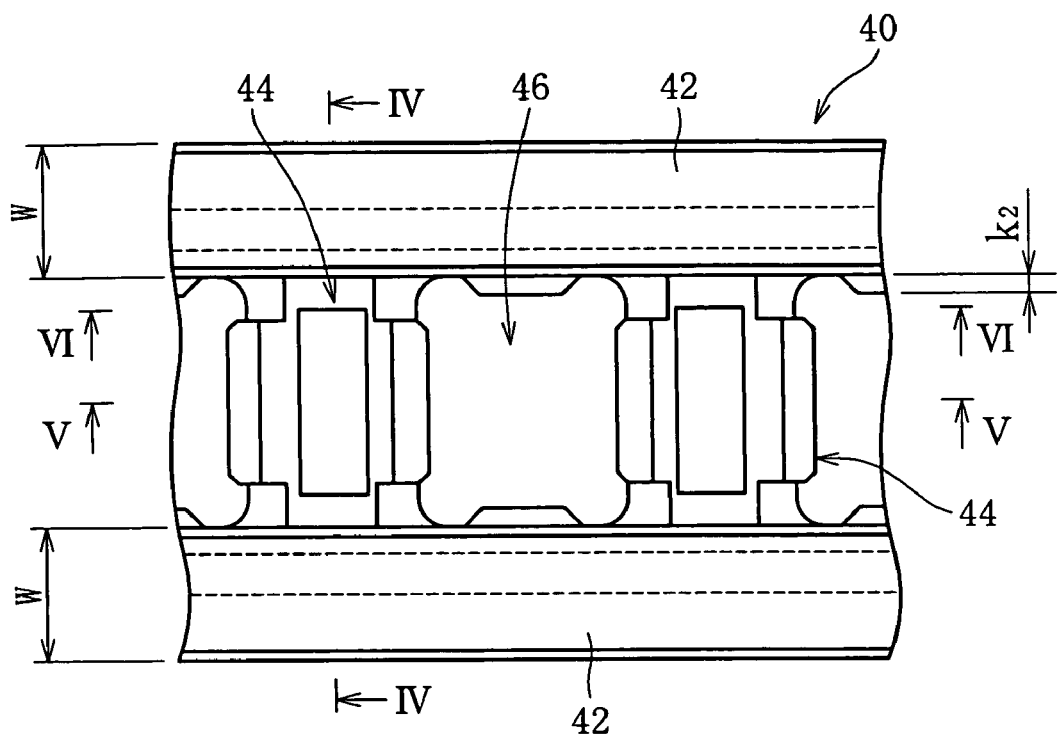
FIG. 2 is a principal plan view of a cage.
Figure 3:
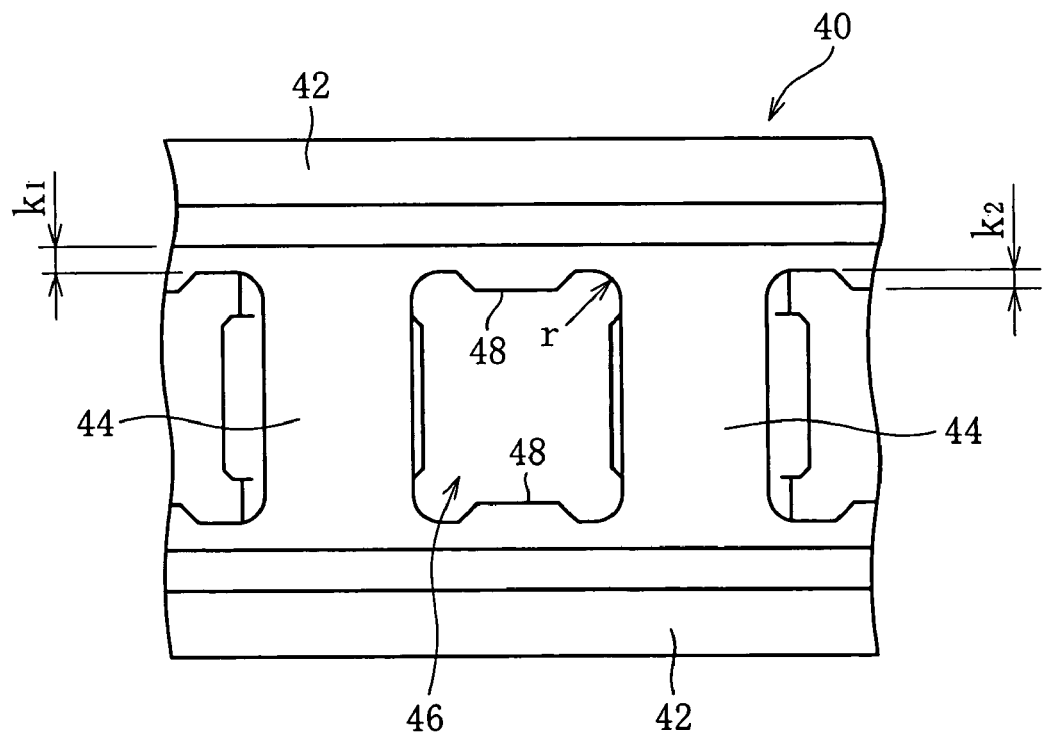
FIG. 3 is a bottom view of the cage of FIG. 2.
Figure 4:
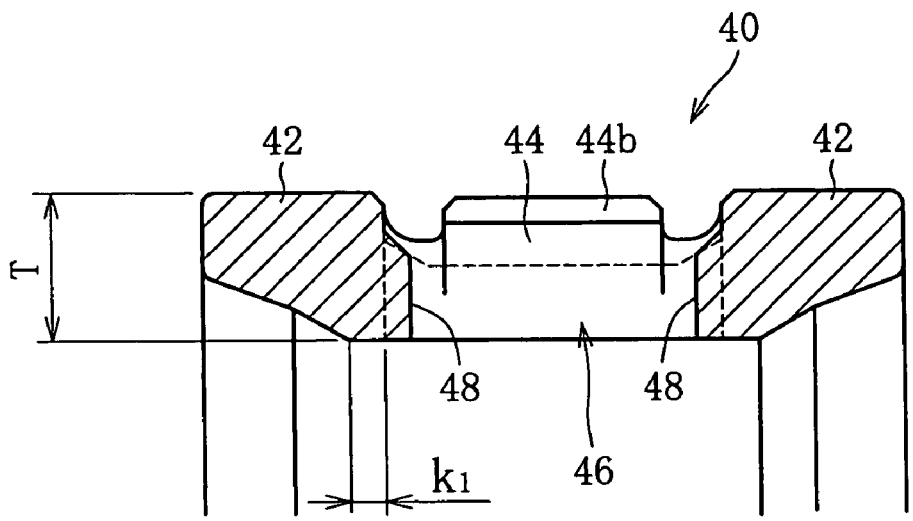
FIG. 4 is a sectional view taken along the line IV-IV in FIG. 2.

FIG. 1A shows a longitudinal section view of a cylindrical roller bearing while FIG. 1B shows a front view of a cylindrical roller bearing 9 to be disposed on the rear side. The cylindrical roller bearing comprises an inner ring 10 having a raceway surface 12 in the outer periphery, an outer ring 20 having a raceway surface 22 in the inner periphery, a plurality of cylindrical rollers 30 rollably disposed between the raceway surface 12 of the inner ring 10 and the raceway surface 22 of the outer ring 20, and a resin cage 40 for holding the cylindrical rollers 30 at predetermined circumferential intervals. The inner ring 10 has ribs 14 on opposite sides.

The ratio Da/H of the diameter Da of the cylindrical roller 30 to the cross-section height H=(D−d)/2 (D: bearing outer diameter, d: bearing inner diameter), and the ratio Lw/B of the length Lw of the cylindrical roller 30 to the bearing width B are set such that $0.3 \leq Da/H < 0.45$, and $0.3 \leq Lw/B < 0.45$, respectively. In addition, the value of the ratio Lw/Da of the length Lw of the cylindrical roller 30 to the diameter Da is, for example, 1. Further, in addition to the above setting, by setting the number of cylindrical rollers 30 at a predetermined number (for example, by reducing it as compared with the number of rollers of a standard cylindrical roller bearing), rigidity equal to or greater than that of a combination angular ball bearing of the same bearing inner diameter and the same bearing outer diameter is secured.

For example, in a rolling bearing incorporated into the main shaft device of a machine tool, normally, the initial radial inner clearance is set to zero or to a slight negative value, but during operation the negative clearance increases due to the temperature difference between the inner and outer rings, resulting in an operation under preloaded conditions. In this case, if the cylindrical roller diameter Da or length Lw becomes too large relative to the other dimensions, this becomes the cause of increasing the generation of heat in the contact region between the cylindrical rollers and the raceway surfaces. Further, in the case of installing the cage, the cylindrical roller diameter Da or length Lw being too large is disadvantageous from the standpoint of securing rigidity or strength of the cage. That is, if the diameter Da is large relative to the cross-section height H, the spacings between the cylindrical rollers is decreased, sometimes making it difficult to sufficiently obtain the circumferential material thickness of the columns of the cage. Further, if the length W becomes large relative to the bearing width B, it becomes sometimes difficult to sufficiently secure the axial material thickness of the annuluses of the cage. In an operation under preloaded conditions, the amount of lag-lead of the orbital motion of the cylindrical rollers increases, and the cage is subjected to a large force from the cylindrical rollers, so that particularly in the case of forming the cage of resin material, a lack in said material thickness sometimes makes it impossible to obtain required rigidity or strength for the cage. On the other hand, if the cylindrical roller diameter Da or length Lw is too small relative to the other dimensions, the basic dynamic load rating becomes too small, causing a decrease in the bearing life. Further, if the diameter Da is small relative to the cross-section height H, it becomes difficult to sufficiently secure the radial material thickness of the cage.

With the above in mind, the optimum ranges of the ratio Da/H and the ratio Lw/B are set such that $0.3 \leq Da/H < 0.45$, and $0.3 \leq Lw/B < 0.45$, respectively. That is, by setting the ratio Da/H and the ratio Lw/B within said ranges, it is made possible to secure the required basic dynamic load rating while suppressing the generation of heat in the contact region between the cylindrical rollers and the raceway surfaces, and in the case of installing the cage, it is possible to obtain the required rigidity or strength while sufficiently securing the material thickness of the cage. Further, with the setting of $0.3 \leq Lw/B < 0.45$, the allowance for axial positioning of the cylindrical rollers and raceway surface increases more than that in the prior art, an advantage that the assembling operation is facilitated.

Figure 5:
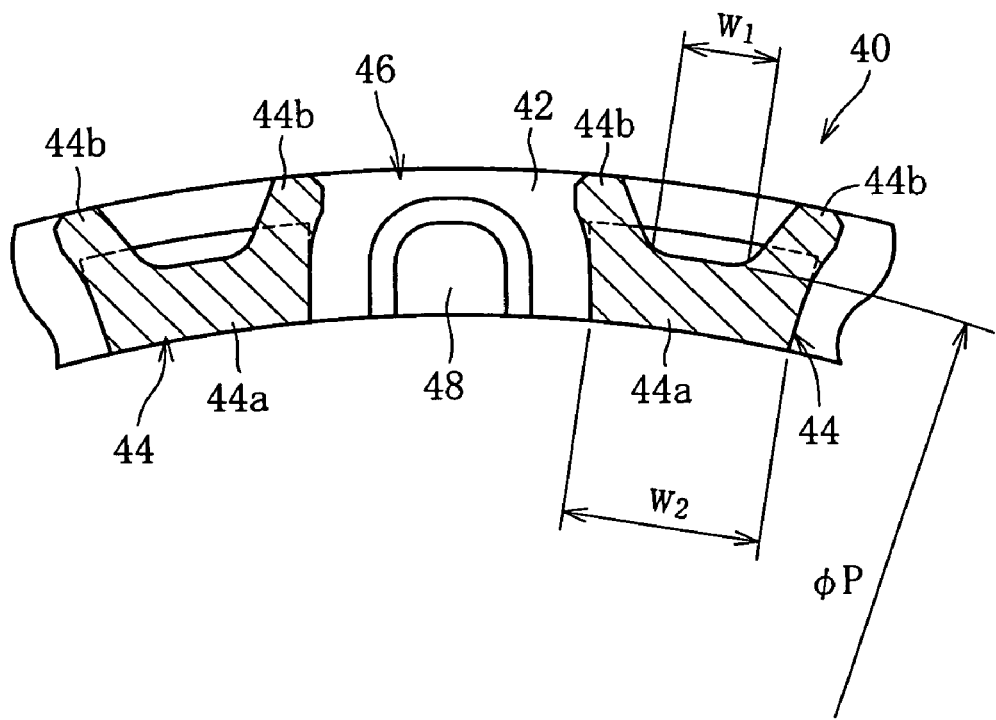
FIG. 5 is a sectional view taken along the line V-V in FIG. 2.

The cage 40 is made of a resin material, for example polyetheretherketone (PEEK) having 20-40 wt % of glass fiber or carbon fiber added thereto, and as shown in FIGS. 2-7, it comprises a pair of axially opposed annuluses 42 spaced a predetermined distance apart from each other, and a plurality of columns 44 interconnecting the annuluses 42. Window-shaped pockets 46 are formed each between adjacent columns 44. Each column 44, as shown in FIG. 5, is provided with a pair of tongues 44b substantially radially bifurcating from base 44a. Further, the inner surface of the annulus 42 constituting the circumferential wall surface of the pocket 46 is provided with a slightly raised contact surface 48 for guiding the end surface of the cylindrical roller 30.

Figure 7:
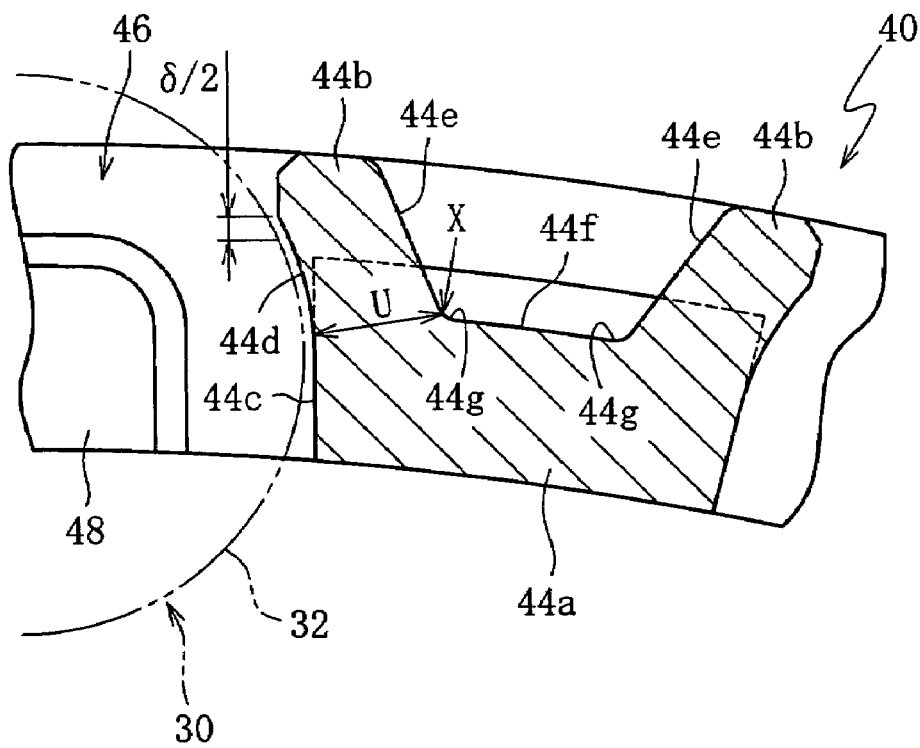
FIG. 7 is a principal sectional view showing the positional relation between the cage and the cylindrical roller.

As shown enlarged in FIG. 7, the lateral surface of the column 44 constituting the axial wall surface of the pocket 46 is composed of a straight surface 44c on the inner diameter side and an arcuate surface 44d on the outer diameter side that are smoothly continuous with each other. The straight surface 44c is formed mainly by one lateral surface of the base 44a, while the arcuate surface 44d is formed mainly by one lateral surface of the tongue 44b. The arcuate surface 44d is described by an arc that has a slightly greater radius of curvature than the radius of curvature of the rolling surface 32 of the cylindrical roller 30. The rolling element guide system is such that when the cylindrical roller 30 makes a relative movement within the pocket 46 radially outward through a predetermined amount, it engages the arcuate surface 44d, whereby the radially outward pull-out of the cylindrical roller 30 is controlled, and the radial positioning is effected by the cylindrical roller and the cage pocket also during the rotation of the bearing. The straight surface 44c and the arcuate surface 44d cooperate with each other to form a guide surface for guiding the rolling surface 32 of the cylindrical roller 30. Further, there is a bottom surface 44f between the other lateral surfaces 44a of the tongues 44b, and corners 44g where the lateral surfaces 44e meet the bottom surface 44f are smoothly connected by arcuate surfaces.

In this embodiment, in order to secure the required rigidity and strength of the cage 40, the material thicknesses of the various sections are set as follows. First, the base end material thickness dimension U (see FIG. 7) of the tongue 44b is set with respect to the diameter Da of the cylindrical roller 30 such that $U/Da \geq 0.2$. In the case where the corners 44g are formed by arcuate surfaces, the base end material thickness U is the minimum dimension from the reference position, which is an intersecting point X between the lateral surface 44e and the corner 44g, to the straight surface 44c or arcuate surface 44d. Next, the axial material thickness W (see FIG. 2) of the annulus 42 is set with respect to the length Lw of the cylindrical roller 30 such that $W/Lw \geq 0.4$, and the radial material thickness T (see FIG. 4) of the annulus 42 is set with respect to the diameter Da of the cylindrical roller 30 such that $0.5 \leq T/Da \leq 0.6$.

Figure 8:
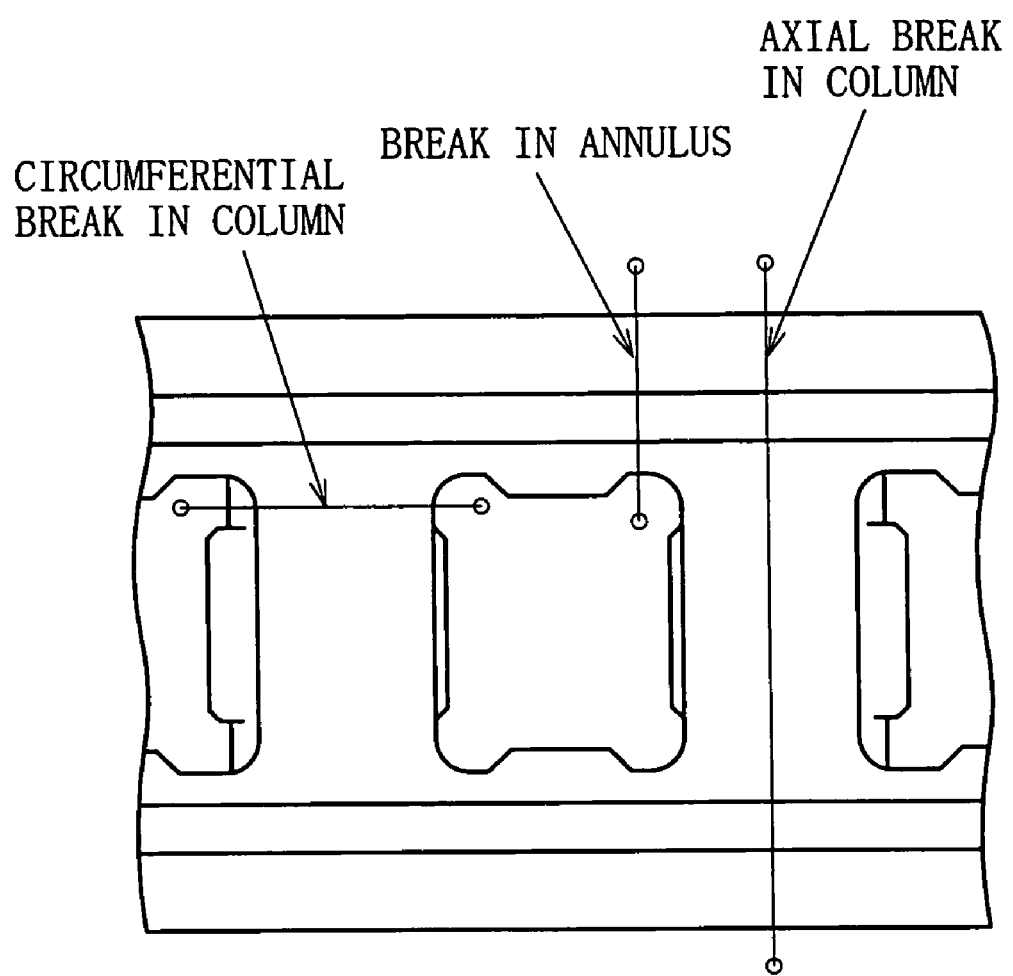
FIG. 8 is a principal plan view similar to FIG. 2 for explanation of how the cage breaks.

The radius of curvature, r, (see FIG. 3) of the corners of the pocket 46 of the cage 40 is set to the relation $r/Lw \geq 0.1$, where Lw is the length of the cylindrical roller 30. Particular attention should be paid to the possibility that as damage to the cage 40, such damage may proceed from the corner of the pocket 46 in the direction of the column 44 or in the direction of the annulus width surface (see FIG. 8). In the case where the radius of curvature, r, of the corners of the pocket 46 is small, stress concentration causes the column 44 or annulus 42 to tend to break; therefore, the radius of curvature, r, of the corners should be large so that $r/Lw \geq 0.1$.

Further, the relation between the radius of curvature, r, of the corners of the pocket 46 of the cage 40 and the minimum dimension k1 (see FIG. 3) on the inner diameter side of the annulus 42 of the cage 40 is set to the relation $r/k1 \leq 1$. If the radius of curvature, r, of the corners is rashly increased in order to mitigate stress concentration, there is a danger of a break occurring in the annulus 42. To avoid this, it is preferable that the radius of curvature, r, of the corners be smaller than the minimum dimension k1 on the inner diameter side of the annulus 42. This is for the purpose of avoiding an annulus break when the annulus 42 of the cage 40 is deformed by lag-lead of the cylindrical rollers 30, at which time the force due to the pulling on the inner diameter side of the annulus 42 would otherwise result in said annulus break.

If the radius of curvature, r, of the corners can be increased and the minimum dimension k1 on the inner diameter side of the annulus 42 can be secured, there will be no problem. However, the width of the cage 40 is generally set smaller than the bearing width surface, and the overall width of the annulus 42 is limited. Further, there are cases where a nozzle-equipped spacer is set in the inner diameter of the cage 40 and the outer diameter of the inner ring 10 (Japanese Patent Application 2002-358850), the minimum dimension k1 on the inner diameter side of the annulus 42 also being limited.

Figure 6:
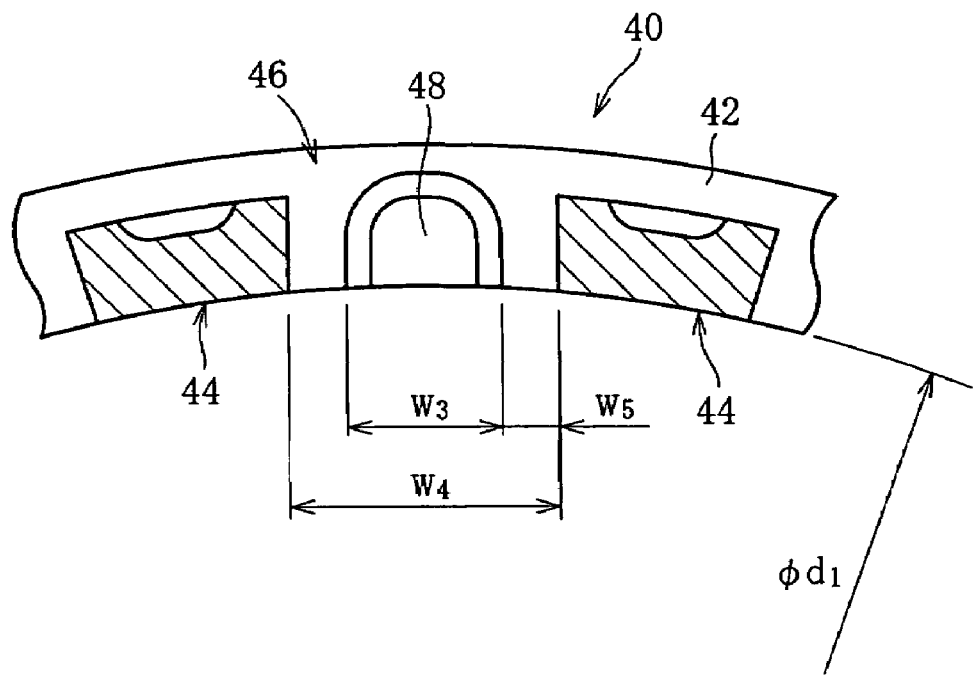
FIG. 6 is a sectional view taken along the line VI-VI in FIG. 2.

As shown in FIG. 6, where w5 is the distance (the minimum material thickness of the annulus) between the contact surface 48 with the roller end surface and the column 44, $\phi d1$ is the inner diameter of the cage, and Z is the number of rollers, they are set to the relation $w5 \cdot Z / \phi d1 \cdot \pi > 0.1$. When the annulus 42 is deformed, the vicinity (w5) of the column 44 of the pocket 46 is where stress easily concentrates, but because of the presence of the raised section 48 that contacts the end surface of the cylinder roller 30, stress concentrates more easily. In order to mitigate stress concentration by securing w5, it is necessary to secure a proportion of w5 with respect to the circumferential length on the inner diameter side of the annulus 42, and an arrangement in which the formula $w5 \cdot Z / \phi d1 \cdot \pi > 0.1$ holds has the effect of avoiding a break in the annulus.

The radius of curvature, r, of the corners of the pocket 46 of the cage 40 is set smaller than the sum of the amount of projection, k2, of the contact surface 48 for contact with the end surface of the cylindrical roller 30 and the axial chamfer r1 of the cylindrical roller 30 (r<k2+r1). This is for the purpose of avoiding interference between the radius of curvature, r, of the corners of the pocket 46 and the chamfer of the cylindrical roller 30.

As shown in FIG. 9, the cylindrical roller bearing 9 of this embodiment has its inner ring 10 fitted on the outer periphery of the main shaft 6 and its outer ring 20 fitted in the inner periphery of the housing 7. The radial inner clearance during operation is set, for example, to a negative clearance, and the interior of the bearing is lubricated by a lubrication system, such as air oil lubrication, oil mist lubrication, jet lubrication, or grease lubrication. When the main shaft 6 is driven for rotation at high speed by the motor 5 housed in the main shaft device, the main shaft 6 is supported for rotation relative to the housing 7 by the angular ball bearing 8 on the front side and the cylindrical roller bearing 9 on the rear side. Further, when the main shaft 6 is axially thermally expanded due to temperature rise during operation, the amount of axial expansion is absorbed or relieved by slide displacement between the outer ring 20 and the cylindrical rollers 30 of the cylindrical roller bearing 9.

Resin cages are produced sometimes by machining; however, molded cages, which are mass-producible, are generally used. In the case where resin cages are molded, it is widely known that the weld (resin joint) decreases in strength; therefore, it is widely practiced to set the weld so as to be positioned in a portion of large material thickness (or of large cross-sectional area). Positioning the weld in the annulus, which has the smallest cross-sectional area, should naturally be avoided. In this case, the weld will be positioned in the column, which has a large cross-sectional area. As shown in FIG. 5, where $\phi P$ is the diameter of the relief bottom of the back of the tongue 44b, w1 is the circumferential dimension of the relief section, and w2 is the circumferential dimension of the inner diameter of the column, they are set to the relation $w1 \cdot Z / \phi p \cdot \pi > 0.1$ and $w1/w2 > 0.3$, whereby even in the case where the weld is positioned in the middle of the column 44, stress concentration is avoided and the cage 40 is allowed to exhibit its function without breaking.

For example, in the case of the inner ring 10 having ribs 14, the outer diameter side of the cage 40 is provided with tongues 44b for preventing the cylindrical rollers 30 from falling off and adapted to be radially positioned by the cylindrical rollers and cage pocket. In the case of a mold, the tongue 44b is smaller than the pocket 46. Therefore, in the case where molding is effected by forcibly radially outwardly drawing out the mold for the pocket, the tongues 44b are elastically deformed to allow forcible draw-out. Further, incorporation of the cylindrical rollers 30 is effected from the outer diameter side, so that the tongues 44b are elastically deformed when the cylindrical rollers 30 are passed. To assist this elastic deformation of the tongues 44b, the columns 44 have their middle portions relief-shaped. Even if the cross section is secured, particular care is needed in positioning the weld in such valley. It has already been described that the cage 40 is deformed by the lag-lead of the cylindrical rollers 30; it is necessary to mitigate stress concentration in the valley due to this deformation.

Figure 11:
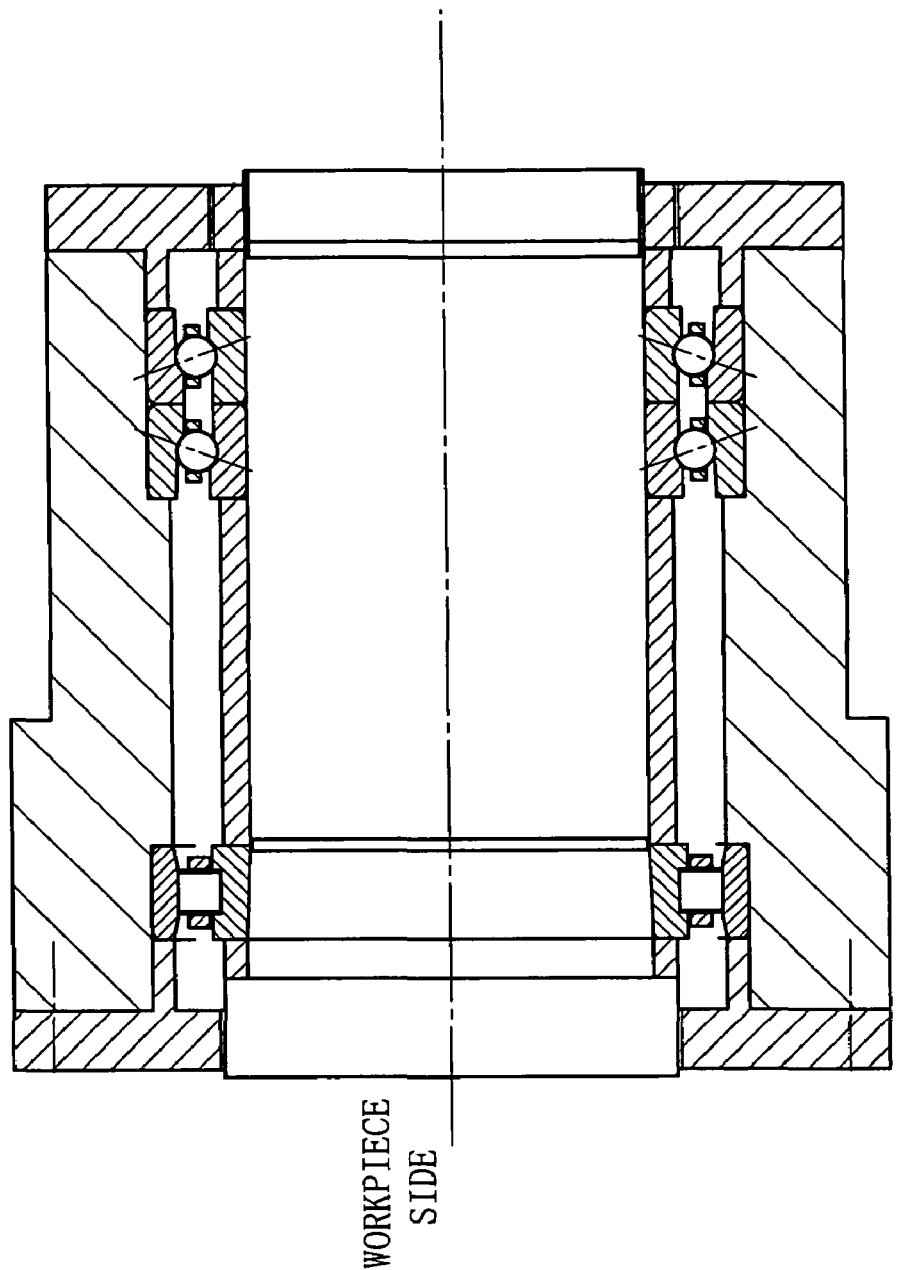
FIG. 11 is a longitudinal sectional view of a spindle device showing the prior art.

For reference, a description will be given of a method of adjusting incorporation clearance of a cylindrical roller bearing used at high speed in the main shaft of a machine tool, or the like. With a recent machine tool, a cylindrical roller bearing has been used as a main shaft bearing and operated frequently at high speed with the intention of improving processing accuracy and processing efficiency. When a cylindrical roller bearing is used for the main shaft, management of the bearing clearance after bearing incorporation becomes functionally important. Conventionally, the incorporation clearance of a cylindrical roller bearing, as shown in FIG. 11, is adjusted by fitting an inner ring whose inner diameter is tapered on the taper shaft portion of the main shaft and expanding the inner ring raceway diameter by axially driving the inner ring.

As to recent machine tools, there is a tendency to operate them at high speed in order to increase machining efficiency. With the conventional bearing clearance adjusting method, however, it is feared that speeding up of the bearings will be interfered with. This is because of the inclination of the inner ring raceway surface that is ascribed to the inner ring inner diameter being tapered. Since there is radial localized material between the tapered large diameter side and the small diameter side, a difference in expansion (large diameter side>small diameter side) will be produced if centrifugal force due to operation acts, with the result that the inner ring raceway surface is inclined, which becomes the main cause of skewing of rollers and hence of friction increase. Further, in the case of clearance adjustment using a taper, the inner ring taper and the shaft taper are separately processed by a bearing maker and a machine tool maker, respectively, resulting in a difference in taper angle between the two products, which forms the cause of a degradation of accuracy when the two are fitted together. Thus, with the conventional bearing having a taper surface on the rotating inner ring, defects due to structural shape tend to occur, becoming a hindrance to speeding up.

Accordingly, it is proposed to effect the post-incorporation bearing clearance adjustment on the outer ring side, not on the inner ring side. The inner ring should have a straight surface and be fitted on the main shaft by ordinary close fitting. And the clearance adjustment is effected by arranging a ring having a bearing clearance adjusting function between the outer ring and the bearing box and axially driving it, thereby radially contracting the outer ring. The amount of contraction of the outer ring is adjusted according to the amount by which the ring is axially driven. Employing such arrangement yields the following effects. Because of the absence of localized material widthwise of the raceway surface of the inner ring, deformation of the raceway surfaces due to centrifugal force during operation does not occur, enabling high speed operation. The taper in the components can be processed in the same place, so that the accuracy of face-to-face fitting is improved. In the respective fit portions of the housing and outer ring, a close fit can be easily obtained, and the accuracy of inner diameter dimension of the housing can be made rough as compared with the prior art. The bearing clearance can be adjusted even after spindle incorporation.

Figure 12:
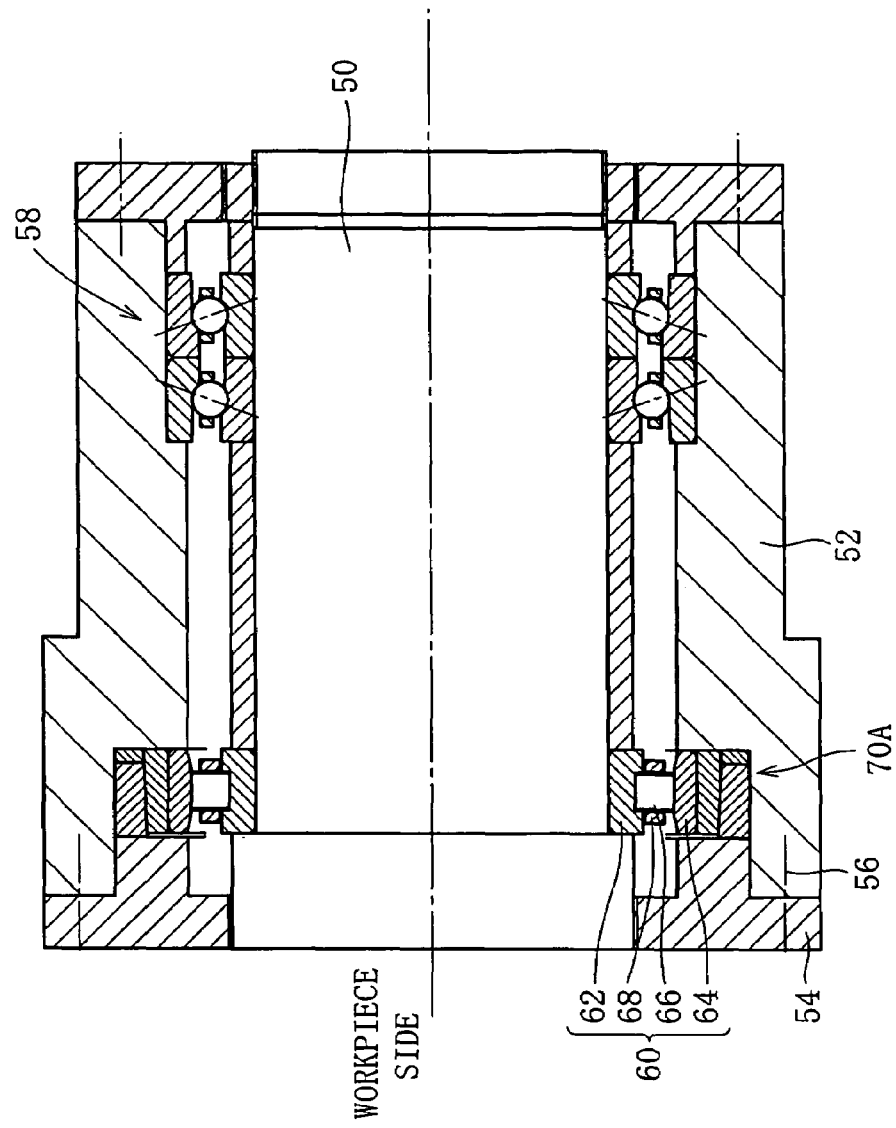
FIG. 12 is a longitudinal sectional view of a spindle device showing an embodiment of the invention.
Figure 13:
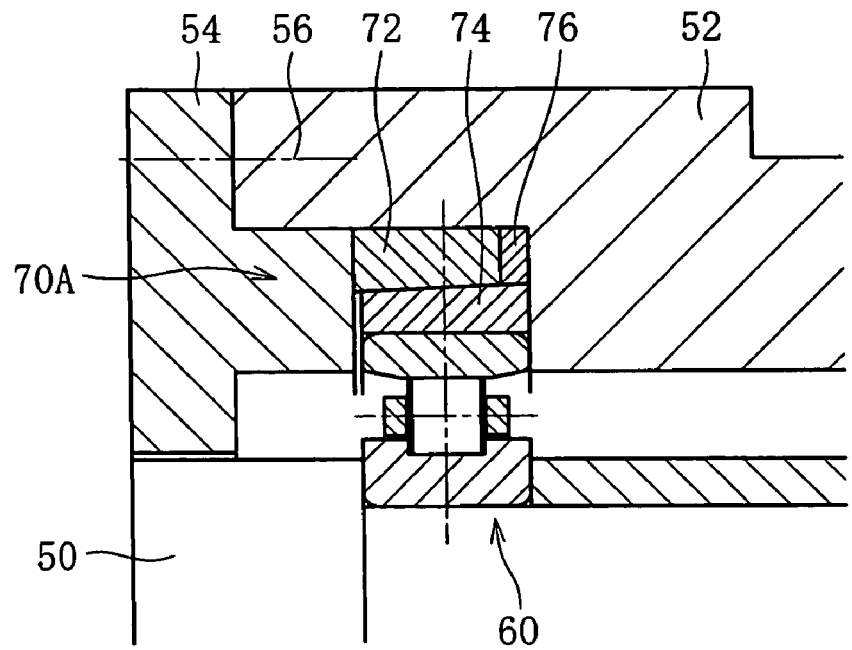
FIG. 13 is a principal enlarged view of FIG. 12.

FIG. 12 shows an example of the main shaft device, or the so-called main shaft spindle, of a machine tool in which a cylindrical roller bearing 60 is disposed on the work side and angular ball bearings 58 are disposed back to back on the counter work side. The cylindrical roller bearing 60 comprises an inner ring 62, an outer ring 64, cylindrical rollers 66, and a cage 68, the inner ring 62 being shrink- or press-fitted on the main shaft 50, the outer ring 64 being fitted in a housing 52. As shown enlarged in FIG. 13, there is provided a clearance adjusting means 70A in the form of a double tube contacting the outer periphery of the cylindrical roller bearing 60 through a taper surface. The clearance adjusting means 70A, in this case, is composed of an outer annulus 72, an inner annulus 74, and a stop 76. The outer annulus 72 is cylindrical in its outer peripheral surface and is fitted in a cylindrical hole in the housing 52 by means of this cylindrical outer peripheral surface. The inner peripheral surface of the outer annulus 72 is a taper surface with its work side (left-hand side in FIG. 13) reduced in diameter. The inner annulus 74 is cylindrical in its inner peripheral surface and is fitted on the outer peripheral surface of the outer ring 64 by means of this cylindrical inner peripheral surface. The outer peripheral surface of the inner annulus 74 is a taper surface corresponding to the inner peripheral surface of the outer annulus 72. A cover 54 axially pushes the outer annulus 72, thereby radially contracting the the inner annulus 74 and the outer ring 64. That is, the inner annulus 74 performs the function of converting the axial thrust produced by the outer annulus 72 into the radial contracting force on the outer ring 64. The stop 76 plays a role in limiting the amount of push-in of the outer annulus 72 and determining the amount of contraction of the outer ring 64.

The bearing clearance adjusting procedure is as follows.

(a) First, the diameter of a circle circumscribed around the cylindrical roller 66 is measured after the inner ring 62 has been press-fitted on the main shaft 50.

(b) And the raceway diameter of the outer ring 64 is determined after incorporation, on the basis of the measured diameter of the circle circumscribed around the cylindrical roller and the amount of a bearing clearance desired to be set.

(c) Next, the outer ring 64 and the clearance adjusting means 70A are incorporated into the housing 52, and the cover 54 is used to axially push the outer annulus 72 until it abuts against the stop 76 (this is caused by the tightening force produced by bolts 56), so as to find the relation between the width dimension of the stop 76 and a change in the outer ring raceway diameter.

(d) On the basis of the relation found in (c) above, the width dimension of the stop 76 required for obtaining the outer ring raceway diameter determined in (b) is determined.

(e) The relation between the width dimension determined in (d) above and the change in the outer ring raceway diameter is found.

Figure 14:
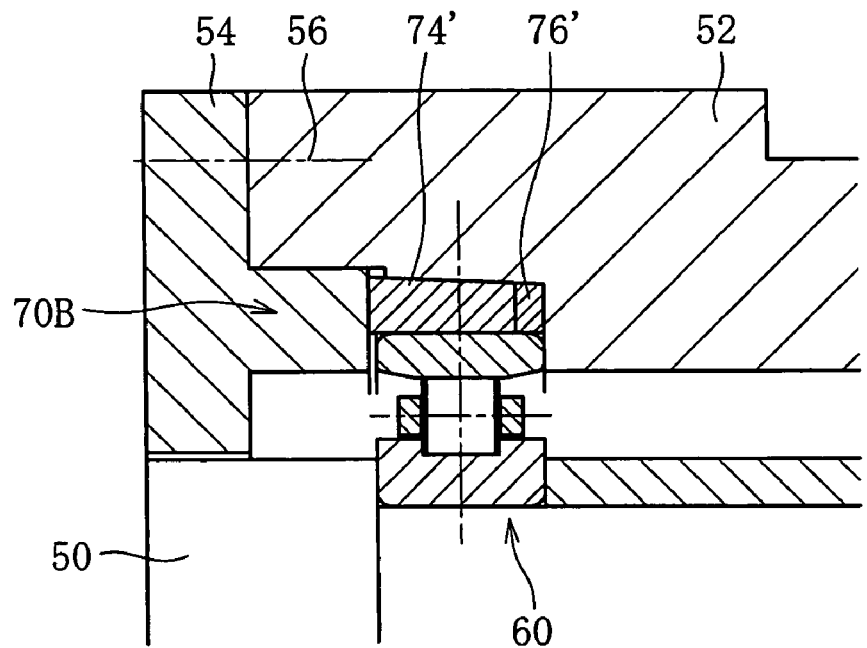
FIG. 14 is an enlarged sectional view similar to FIG. 13, showing another embodiment of the invention.

The above example refers to the case of using the clearance adjusting means 70A in the form of a double tube contacting between the outer peripheral surface of the outer ring 64 and the housing 52 through a taper surface. If a taper surface can be formed in the bearing insertion section of the housing 52, however, the outer annulus 72 can be dispensed with for simplification. FIG. 14 shows such clearance adjusting means 70B, wherein the housing 52 is formed with a taper hole and an annular body 74' having a taper surface corresponding to the taper surface of the taper hole is inserted therein. Disposed on the innermost side of the annular body 74' is a stop 76' that performs the function of determining the amount of contraction of the outer ring 64 by limiting the amount of axial push-in of the annular body 74'. The bearing clearance adjustment may be effected in the same manner as described above.

Figure 15:
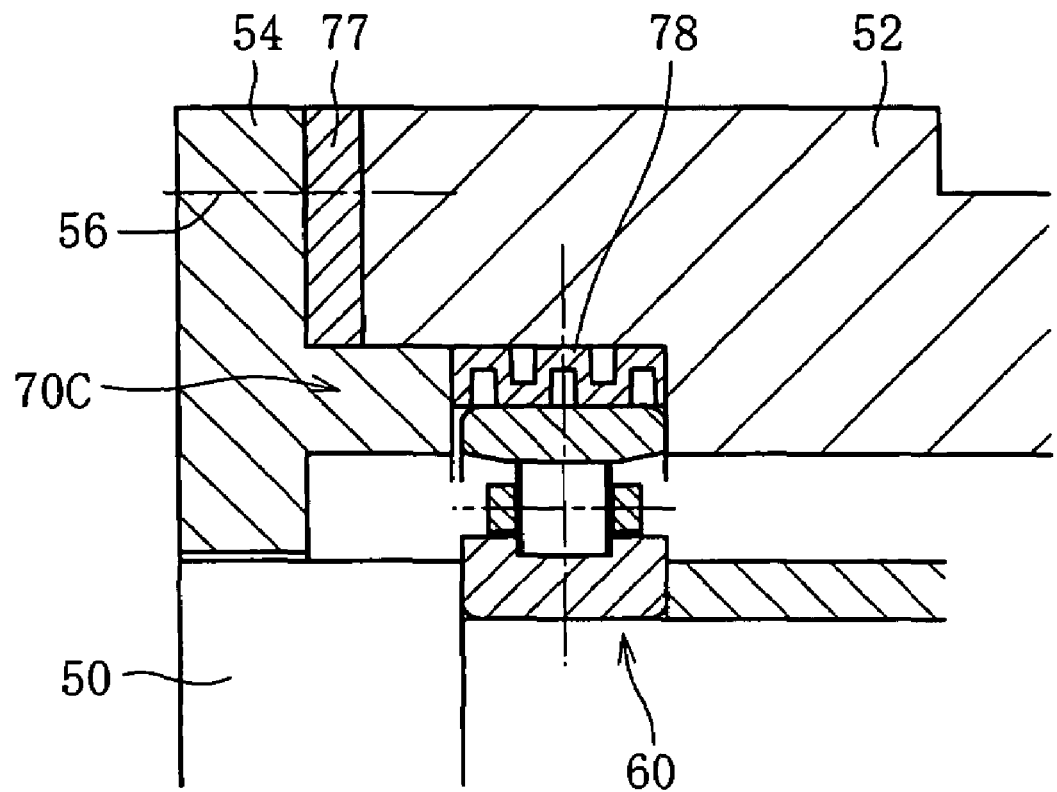
FIG. 15 is an enlarged sectional view similar to FIG. 13, showing yet another embodiment of the invention.

Further, as shown in FIG. 15, there maybe thought of a method using a clearance adjusting means 70C having a special cross-sectional shape. The clearance adjusting means 70C includes a ring 78 interposed between the outer peripheral surface of the outer ring 64 and the housing 52, and a spacer 77 interposed between the housing 52 and the cover 54. The spacer 77 plays a role in axially positioning the cover 54. Axial deformation of the ring 78 causes contraction of the inner diameter dimension of said ring 78, and the outer ring 64 fitted in the inner peripheral surface thereof is likewise contracted to have its inner diameter dimension adjusted. Since the amount of dimensional adjustment is determined by the amount of axial deformation of the ring 78, it is only necessary to adjust the width dimension of the spacer 77 that limits the amount of axial deformation of the ring 78.

What is claimed is:

1. A cylindrical roller bearing cage in combination with a plurality of cylindrical rollers comprising:
   a pair of annuluses,
   a plurality of columns interconnecting the annuluses, and
   a plurality of pockets defined therein receiving the cylindrical rollers between adjacent columns, the pair of annuluses extending orthogonally relative to the columns,
   wherein each column is provided with a pair of tongues extending radially away from a base of the column,
   wherein each tongue of the pair of tongues is connected to a relatively planar bottom surface disposed between the pair of tongues by an arcuate surface disposed between each tongue of the pair of tongues and an end of the relatively planar bottom surface, each tongue having a planar end face that is coplanar with an outermost surface of a corresponding annulus of the pair of annuluses, and
   wherein a relation $r/Lw \geqq 0.1$ holds where r is a radius of curvature of corners of the pockets, and Lw is a length of the cylindrical rollers.

2. The cylindrical roller bearing cage in combination with a plurality of cylindrical rollers as set forth in claim 1, wherein a relation $r/k1 \leqq 1$ holds, where k1 is a minimum dimension on an inner diameter side of an annulus of the cage between a pocket and the annulus in a direction that is parallel to a longitudinal axis of the cage.

3. The cylindrical roller bearing cage in combination with a plurality of cylindrical rollers as set forth in claim 1, wherein a relation $w5 \cdot Z/\phi d1 \cdot \pi > 0.1$ holds, where $\phi d1$ is an inner diameter of the cage, w5 is a distance from a contact section of a pocket that contacts a cylindrical roller end surface to a column, and Z is a number of cylindrical rollers.

4. The cylindrical roller bearing cage in combination with a plurality of cylindrical rollers as set forth in claim 1, wherein a relation r<k2+r1 holds, where k2 is an amount of projection of a contact section of the pocket for contact with a cylindrical roller end surface, and r1 is an axial chamfer of the cylindrical roller.

5. The cylindrical roller bearing cage in combination with a plurality of cylindrical rollers as set forth in claim 1, wherein an inner surface of each annulus defines a circumferential wall surface of a corresponding pocket and is provided with a raised contact surface for guiding an end surface of a corresponding cylindrical roller.

6. The cylindrical roller bearing cage in combination with a plurality of cylindrical rollers as set forth in claim 1, wherein a lateral surface of each column defines an axial wall surface of a corresponding pocket, the axial wall surface including a straight surface formed by a lateral surface of the base and an arcuate section formed by a lateral surface of a corresponding tongue, and wherein the straight surface and the arcuate section cooperate to define a guide surface for guiding a rolling surface of a corresponding cylindrical roller.

7. The cylindrical roller bearing cage in combination with a plurality of cylindrical rollers as set forth in claim 1, wherein inner lateral surfaces of each tongue are connected by a bottom surface defined on an outer surface of the base.

8. A cylindrical roller bearing comprising:
an inner ring having a raceway surface in an outer periphery,
an outer ring having a raceway surface in an inner periphery,
a plurality of cylindrical rollers rollably disposed between the raceway surface of the inner ring and the raceway surface of the outer ring, and
a resin cage holding the cylindrical rollers at predetermined intervals,
wherein said cage includes a pair of annuluses, a plurality of columns interconnecting the annuluses, and pockets defined therein for receiving cylindrical rollers between adjacent columns and which are radially positioned with respect to the cylindrical rollers, the pair of annuluses extending orthogonally relative to the columns,
wherein each column is provided with a pair of tongues extending radially away from a base of the column,
wherein each tongue of the pair of tongues is connected to a relatively planar bottom surface disposed between the pair of tongues by an arcuate surface disposed between each tongue of the pair of tongues and an end of the relatively planar bottom surface, each tongue having a planar end face that is coplanar with an outermost surface of a corresponding annulus from the pair of annuluses, and
wherein a relation r/Lw 0.1 holds where r is a radius of curvature of corners of the pockets, and Lw is a length of the cylindrical rollers.

9. The cylindrical roller bearing as set forth in claim 8, wherein a relation $r/k1 \leq 1$ holds, where k1 is a minimum dimension on an inner diameter side of an annulus of the cage between a pocket and the annulus in a direction that is parallel to a longitudinal axis of the cage.

10. The cylindrical roller bearing as set forth in claim 9, wherein a relation r <k2+r1 holds, where k2 is an amount of projection of a contact section of the pocket for contact with a cylindrical roller end surface, and r1 is an axial chamfer of the cylindrical roller.

11. The cylindrical roller bearing as set forth in claim 8, wherein a relation r <k2+r1 holds, where k2 is an amount of projection of a contact section of the pocket for contact with a cylindrical roller end surface, and r1 is an axial chamfer of the cylindrical roller.

12. The cylindrical roller bearing as set forth in claim 8, wherein a relation w5·Z/φd1·π>0.1 holds, where φd1 is an inner diameter of the cage, w5 is a distance from a contact section of a pocket that contacts a cylindrical roller end surface to a column, and Z is a number of cylindrical rollers.

13. The cylindrical roller bearing as set forth in claim 8, wherein an inner surface of each annulus defines a circumferential wall surface of a corresponding pocket and is provided with a raised contact surface for guiding an end surface of a corresponding cylindrical roller.

14. The cylindrical roller bearing as set forth in claim 8, wherein a lateral surface of each column defines an axial wall surface of a corresponding pocket, the axial wall surface including a straight surface formed by a lateral surface of the base and an arcuate section formed by a lateral surface of a corresponding tongue, and wherein the straight surface and the arcuate section cooperate to define a guide surface for guiding a rolling surface of a corresponding cylindrical roller.

15. The cylindrical roller bearing as set forth in claim 8, wherein inner lateral surfaces of each tongue are connected by a bottom surface defined on an outer surface of the base.

\* \* \* \* \*